April 1, 1924.
O. HAENTJENS
PUMP
Filed Jan. 30, 1922
1,489,122
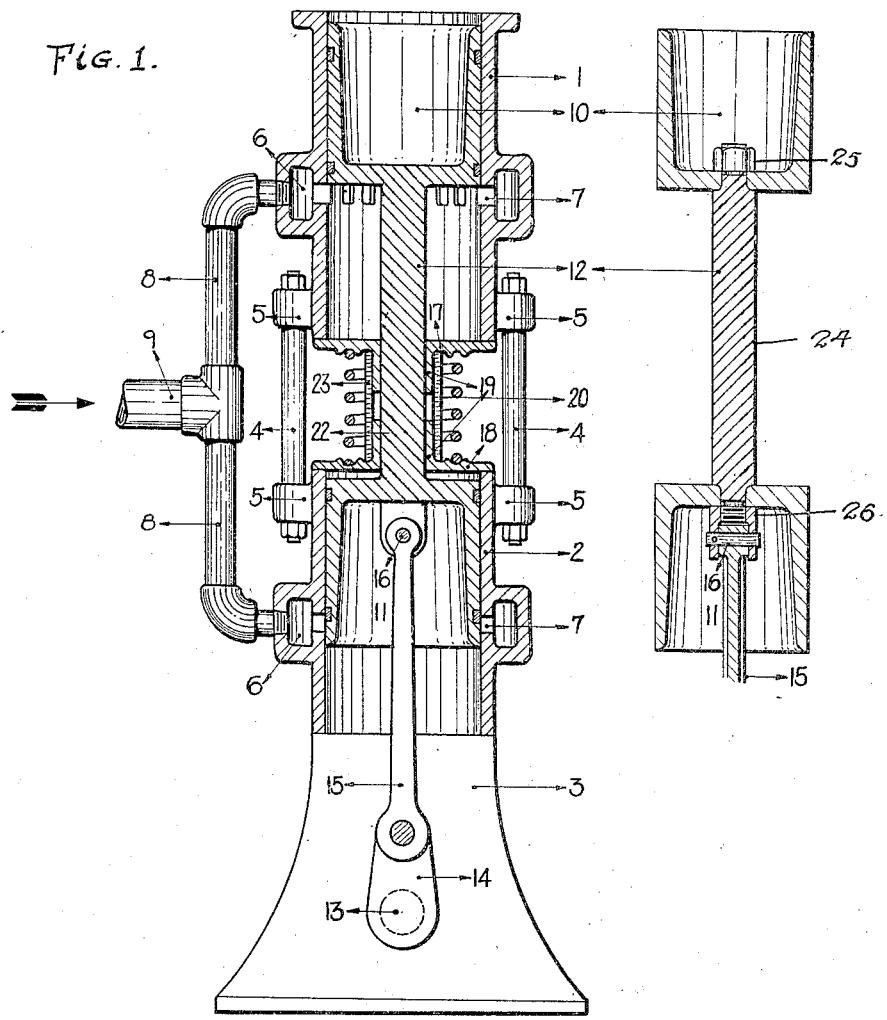

Patented Apr. 1, 1924.

1,489,122

UNITED STATES PATENT OFFICE.

OTTO HAENTJENS, OF HAZLETON, PENNSYLVANIA.

PUMP.

Application filed January 30, 1922. Serial No. 532,783.

*To all whom it may concern:*

Be it known that I, OTTO HAENTJENS, a citizen of the German Republic, residing at Hazleton, in the county of Luzerne and State of Pennsylvania, have invented certain new and useful Improvements in Pumps, of which the following is a specification.

My invention relates to pumps, and particularly to vacuum pumps, the object of my invention being to provide a pump of simple and efficient design which requires no priming, has exposed valves which are easily accessible for inspection, has efficient means for preventing leakage between the valves and the piston rod passing through the same, and insures complete exhaustion of the piston cylinders, thus giving maximum efficiency to the piston stroke.

In the accompanying drawing—

Fig. 1 is a vertical mid-section through a pump in which my invention is embodied in one form; and Fig. 2 is a similar view of the pistons and piston rod showing a detachable connection.

The present pump is designed primarily as a vacuum pump for priming an associated centrifugal pump, in a system such as indicated in my application of even date. Its utility, however, is not limited to this particular field.

As shown in Fig. 1, in more or less diagrammatic form, the present pump comprises a pair of cylinders 1 and 2 which may be of identical construction, the lower cylinder resting upon a suitable pedestal support 3. The cylinders are spaced apart, but united by a group of spacing bolts 4, the reduced ends of which pass through suitably pierced lateral lugs 5 adjacent the cylinder ends. Each cylinder is provided with a lateral annular inlet passage 6, which communicates on the one hand with the interior of its cylinder through ports 7 opening through the wall thereof, and on the other hand, with inlet pipe 8 connected to the suction line 9.

Working within the cylinders are two cup pistons 10 and 11 coupled together by a piston rod 12. The pistons are thus driven in unison from any suitable source of power, such as a shaft 13, crank 14, and connecting rod 15 jointed at 16 to the lower piston 11.

The adjacent ends of the cylinders 1 and 2 are normally closed by valves 17 and 18, through the hubs 19 of which the piston rod 12 passes. A coil spring 20 interposed between the two valves, tends constantly to hold the latter to their seats. Closely surrounding the hubs 19 of the valves is a flexible packing sleeve 23 which serves to prevent leakage of air to the cylinders through the slide bearing between the valve hubs and the piston rod 12. While I have shown both a valve spring 20 and a packing sleeve 23, it may in some cases suffice to utilize the flexible packing sleeve alone as the means for maintaining the valves seated.

The operation of the pump is readily understood. Upon the drive of the pump from the shaft 13, the piston 11 rising in the cylinder 2 compresses the air in its working chamber and thus lifts the valve 18 from its seat and discharges the compressed air to atmosphere. As the piston 11 rises, the piston 10 in cylinder 1 also rises, thus creating a partial vacuum in its working chamber. Toward the end of the working stroke, the ports 7 in cylinder 1 are uncovered and air is admitted to the working chamber from the suction line 9. A reversal of the stroke repeats the operation, but in the opposite direction. Leakage of air into the working chambers of the cylinders on the suction strokes of the pistons is effectively prevented, at the slide bearings of the piston rod 12 in the hubs of the valves 17 and 18, by means of the flexible sleeve 23 which forms a seal for the bearings without, however, materially affecting the operation of the valves. The valves themselves are accessible at all times for inspection.

The construction of the piston rod 12, and its connection to the pistons, is shown merely diagrammatically in Fig. 1. Any usual connection may be employed which will permit the piston rod to be disconnected from one or both of the pistons to permit the valves 17 and 18, and their associated parts, to be slipped into position on the rod 12, while the latter is disconnected. Thus, in Fig. 2 the piston rod 24 is shouldered and threaded at its opposite ends to pass through the piston heads against which it is secured by nuts 25 and 26. The nut 26 is pierced to accommodate the cross pin connection 16 to the connecting rod 15. The cylinders 1 and 2 may be formed as a single casting with lateral ports between the adjacent ends of the working chambers, where such a construction is deemed desirable.

Various other modifications in construction will readily occur to those dealing with the problem, without departing from what I claim as my invention.

I claim—

1. In a pump of the type described, a pair of axially aligned working cylinders having discharge ports at their adjacent ends oppositely acting pistons in said cylinders, a pair of valves normally closing said ports, a piston rod joining said pistons and passing through said valves, and means common to said valves for holding the same to their seats.

2. In a pump of the type described, a pair of axially aligned working cylinders having discharge ports at their adjacent ends oppositely acting pistons in said cylinders, a pair of valves normally closing said ports, a piston rod joining said piston and passing through said valves and means common to said valves for holding the same to their seats, said valves being arranged outside the cylinders and accessible for inspection during the operation of the pump.

3. In a pump of the type described, a pair of axially aligned working cylinders having ports at their adjacent ends, valves controlling said ports, a piston rod passing through said valves pistons at opposite ends of said rods, and a flexible packing sleeve surrounding said piston rod and sealing the slide bearings between said valves and piston rod.

4. In a pump of the type described, a pair of axially aligned working cylinders having ports at their adjacent ends, valves controlling said ports, a piston rod passing through said valves pistons at opposite ends of said rods, and a flexible packing sleeve surrounding said piston rod and sealing the slide bearings between said valves and piston rod, said valves having bearing hubs on which said packing sleeve is fitted.

5. A pump of the type described, a pair of axially aligned working cylinders having ports at their adjacent ends, pistons on said cylinders, a connecting rod passing through said ports and connected to said pistons, valves closing said ports and through which said piston rod slides, a coil spring extending between said valves and tending to maintain the same on their seats, in combination with a packing sleeve arranged within said coil spring and engaging the valves to seal the slide joint between the same and the piston rod.

6. In a pump of the type described, a pair of axially aligned cylinders open at their adjacent ends, a pair of valves normally closing said ends, said valves discharging to atmosphere and being exposed and accessible for inspection at all times, together with oppositely acting pistons in said cylinders discharging alternately through the open ends of said cylinders.

7. In a pump of the type described, a pair of cylinders open at their adjacent ends, spacing means holding said cylinders in axial alignment but with their adjacent ends spaced apart, and valves arranged in the interspace between the cylinders and normally closing the adjacent ends thereof, said valves being accessible for inspection during the operation of the pump, together with oppositely acting pistons in said cylinders.

8. In a pump of the type described, a pair of open-ended, axially aligned cylinders having their open ends adjacent but spaced apart, exterior, outwardly opening valves seated against said open ends of the cylinders and accessible for inspection during the operation of the pump, means normally maintaining said valves seated, and pistons working in said cylinders.

In testimony whereof I have signed my name to this specification.

OTTO HAENTJENS.